United States Patent
White et al.

(10) Patent No.: US 12,036,638 B2
(45) Date of Patent: *Jul. 16, 2024

(54) PROCESS FOR MANUFACTURING SCRUBBY SUBSTRATES AND SUBSTRATES MADE THEREFROM

(71) Applicant: THE CLOROX COMPANY, Oakland, CA (US)

(72) Inventors: Edward Jason White, Pleasanton, CA (US); Samuel Hugley, Pleasanton, CA (US)

(73) Assignee: THE CLOROX COMPANY, Oakland, CA (US)

( * ) Notice: Subject to any disclaimer, the term of this patent is extended or adjusted under 35 U.S.C. 154(b) by 457 days.

This patent is subject to a terminal disclaimer.

(21) Appl. No.: 17/212,191

(22) Filed: Mar. 25, 2021

(65) Prior Publication Data

US 2021/0205959 A1 Jul. 8, 2021

Related U.S. Application Data

(63) Continuation of application No. 16/678,023, filed on Nov. 8, 2019, now Pat. No. 11,007,622, which is a
(Continued)

(51) Int. Cl.
*B23B 5/26* (2006.01)
*A47L 13/17* (2006.01)
(Continued)

(52) U.S. Cl.
CPC .......... *B24D 18/0063* (2013.01); *A47L 13/17* (2013.01); *B32B 3/10* (2013.01);
(Continued)

(58) Field of Classification Search
CPC .................................... D04H 1/56; B23B 5/26
See application file for complete search history.

(56) References Cited

U.S. PATENT DOCUMENTS 3,152,181 A 10/1964 Shapiro et al.
3,387,956 A * 6/1968 Blue .................... B24D 11/003
51/296

(Continued)

FOREIGN PATENT DOCUMENTS

AU 2016232774 A1 9/2016
CA 2434474 C * 5/2011 ........... C11D 17/049
(Continued)

OTHER PUBLICATIONS

International Search Report PCT/US/2016/023210; The Clorox Company; May 31, 2016.
(Continued)

*Primary Examiner* — Cachet I Proctor
(74) *Attorney, Agent, or Firm* — Workman Nydegger

(57) ABSTRACT

In-line processes for producing scrubby substrates, and related scrubby substrate cleaning articles. The process may include melting a polymer resin material, and extruding or otherwise dispensing the molten polymer resin material through one or more orifices of a heated nozzle, into a stream of hot inert gas, which attenuates the molten resin, so that the resin forms into elongated globules (rather than fibers or filaments). Such globules may have irregular cross-section and/or irregular thickness along a length of the globules. Alternatively, the molten resin may be formed into substantially continuous or discontinuous string or chain pattern of abrasive fibers, exhibiting a high frequency, low amplitude substantially linear pattern on the base substrate. In either case the globules or abrasive fibers are collected onto at least a portion of a base substrate layer to form a scrubby substrate that is more abrasive than typical meltblown materials.

17 Claims, 9 Drawing Sheets

Related U.S. Application Data continuation of application No. 15/073,438, filed on Mar. 17, 2016, now Pat. No. 10,507,566.

(60) Provisional application No. 62/134,774, filed on Mar. 18, 2015.

(51) Int. Cl.

| | |
|---|---|
| *B24D 18/00* | (2006.01) |
| *B32B 3/10* | (2006.01) |
| *B32B 3/30* | (2006.01) |
| *B32B 5/02* | (2006.01) |
| *B32B 5/26* | (2006.01) |
| *B32B 7/05* | (2019.01) |
| *B32B 7/12* | (2006.01) |
| *B32B 23/10* | (2006.01) |
| *B32B 27/12* | (2006.01) |
| *B32B 27/28* | (2006.01) |
| *B32B 27/30* | (2006.01) |
| *B32B 27/32* | (2006.01) |
| *B32B 27/34* | (2006.01) |
| *B32B 27/36* | (2006.01) |
| *B32B 27/38* | (2006.01) |
| *B32B 27/40* | (2006.01) |
| *B32B 27/42* | (2006.01) |
| *B32B 37/24* | (2006.01) |
| *D04H 1/413* | (2012.01) |
| *D04H 1/559* | (2012.01) |
| *D04H 1/56* | (2006.01) |
| *B32B 37/15* | (2006.01) |

(52) U.S. Cl.
CPC ............ *B32B 3/30* (2013.01); *B32B 5/02* (2013.01); *B32B 5/022* (2013.01); *B32B 5/26* (2013.01); *B32B 7/05* (2019.01); *B32B 7/12* (2013.01); *B32B 23/10* (2013.01); *B32B 27/12* (2013.01); *B32B 27/283* (2013.01); *B32B 27/302* (2013.01); *B32B 27/306* (2013.01); *B32B 27/32* (2013.01); *B32B 27/34* (2013.01); *B32B 27/36* (2013.01); *B32B 27/38* (2013.01); *B32B 27/40* (2013.01); *B32B 27/42* (2013.01); *B32B 37/24* (2013.01); *D04H 1/413* (2013.01); *D04H 1/559* (2013.01); *D04H 1/56* (2013.01); *B32B 37/153* (2013.01); *B32B 2037/243* (2013.01); *B32B 2262/0223* (2013.01); *B32B 2262/0253* (2013.01); *B32B 2262/0261* (2013.01); *B32B 2262/0276* (2013.01); *B32B 2262/0292* (2013.01); *B32B 2262/04* (2013.01); *B32B 2262/062* (2013.01); *B32B 2264/102* (2013.01); *B32B 2270/00* (2013.01); *B32B 2307/4026* (2013.01); *B32B 2307/536* (2013.01); *B32B 2307/538* (2013.01); *B32B 2432/00* (2013.01); *B32B 2555/00* (2013.01)

(56) References Cited

U.S. PATENT DOCUMENTS

| | | |
|---|---|---|
| 3,835,057 A | 9/1974 | Cheng et al. |
| 3,929,678 A | 12/1975 | Laughlin et al. |
| 4,078,340 A | 3/1978 | Klecker et al. |
| 4,163,800 A | 8/1979 | Wickett et al. |
| 4,259,217 A | 3/1981 | Murphy |
| 4,565,647 A | 1/1986 | Llenado |
| 4,714,563 A | 12/1987 | Kajs et al. |
| 5,213,588 A | 5/1993 | Wong et al. |
| 5,350,620 A | 9/1994 | Sundet et al. |
| 5,582,907 A * | 12/1996 | Pall ............... D04H 1/43838 428/317.1 |
| 5,607,980 A | 3/1997 | McAtee et al. |
| 5,681,802 A | 10/1997 | Fujiwara et al. |
| 5,683,971 A | 11/1997 | Rose et al. |
| 5,686,089 A | 11/1997 | Mitra et al. |
| 5,776,872 A | 7/1998 | Giret et al. |
| 5,786,065 A | 7/1998 | Annis et al. |
| 5,883,059 A | 3/1999 | Furman et al. |
| 5,883,062 A | 3/1999 | Addison et al. |
| 5,906,973 A | 5/1999 | Ouzounis et al. |
| 5,989,682 A | 11/1999 | Anderson |
| 6,302,930 B1 | 10/2001 | Lux |
| 6,432,429 B1 * | 8/2002 | Maddern ............... A61K 8/31 424/443 |
| 7,994,079 B2 | 8/2011 | Chen et al. |
| 10,507,566 B2 | 12/2019 | White et al. |
| 11,007,622 B2 | 5/2021 | White et al. |
| 2004/0115431 A1 * | 6/2004 | Chen ................. B32B 29/02 428/304.4 |
| 2004/0253893 A1 | 12/2004 | Castellani |
| 2005/0130536 A1 | 6/2005 | Siebers et al. |
| 2005/0136772 A1 * | 6/2005 | Chen ................. D04H 3/16 442/381 |
| 2005/0137549 A1 | 6/2005 | Lindsay et al. |
| 2007/0151064 A1 | 7/2007 | O'Connor et al. |
| 2008/0127572 A1 | 6/2008 | Ludwig |
| 2008/0293613 A1 * | 11/2008 | Johnson ............... A47L 13/17 510/438 |
| 2013/0111682 A1 | 5/2013 | Pung et al. |
| 2016/0000291 A1 * | 1/2016 | Calderas ............. A61Q 19/00 15/229.12 |
| 2020/0078905 A1 | 3/2020 | White et al. |

FOREIGN PATENT DOCUMENTS

| | | | |
|---|---|---|---|
| CA | 2977744 A | 9/2016 | |
| CL | 2017002309 A1 | 3/2018 | |
| EP | 0244934 A2 * | 3/1987 | |
| EP | 0244934 A2 | 11/1987 | |
| EP | 3270757 B1 | 6/2020 | |
| ES | 2806208 T3 | 2/2021 | |
| GB | 2004735 A | 4/1979 | |
| GB | 2267681 A | 12/1993 | |
| GB | 2330765 A * | 5/1999 | ........... C11D 17/049 |
| MX | 2017/011850 A | 12/2017 | |
| WO | 2016/149646 A1 | 9/2016 | |

OTHER PUBLICATIONS

EP Search Report dated Oct. 12, 2018, EP Application EP 16765847.5.

Final Office Action received for U.S. Appl. No. 15/073,438, mailed on Jul. 26, 2019, 9 pages.

Non-Final Office Action received for U.S. Appl. No. 15/073,438, mailed on Jun. 14, 2018, 12 pages.

Non-Final Office Action received for U.S. Appl. No. 16/678,023, mailed on Dec. 30, 2020, 9 pages.

Notice of Allowance received for U.S. Appl. No. 15/073,438, mailed on Aug. 26, 2019, 5 pages.

Notice of Allowance received for U.S. Appl. No. 16/678,023, mailed on Mar. 9, 2021, 5 pages.

Restriction Requirement received for U.S. Appl. No. 15/073,438, mailed on Mar. 7, 2018, 6 pages.

* cited by examiner

PROCESS FOR MANUFACTURING SCRUBBY SUBSTRATES AND SUBSTRATES MADE THEREFROM

CROSS-REFERENCE TO RELATED APPLICATIONS

The present application is a continuation of co-pending U.S. patent application Ser. No. 16/678,023, filed Nov. 8, 2019, which is in turn a continuation of U.S. patent application Ser. No. 15/073,438, filed Mar. 17, 2016 and entitled "Process for Manufacturing Scrubby Substrate and Substrates Made Therefrom", which is now U.S. Pat. No. 10,507,566, issued Dec. 17, 2019 and which claims the benefit of Provisional Patent Application Ser. No. 62/134,774, filed Mar. 18, 2015 and entitled "In-Line Process for Creating Scrubby Substrates and the Substrates Made Therefrom". The disclosure of all of the above patent and patent applications are hereby incorporated by reference in their entirety.

BACKGROUND OF THE INVENTION

1. Technical Field

The present invention is directed to a process for creating scrubby substrates and the disposable scrubbing products often useful in household cleaning or personal care application. The scrubby substrates may be used alone or with a cleaning tool including a handle and a rigid base to which the scrubby substrate of the present invention may be removably attached.

2. Description of the Related Art

Consumers routinely clean countertops, tabletops, sinks, bathroom and kitchen tile, and other similar household hard surfaces using various cleaning articles and cleaning compositions. While various devices have been employed in such cleaning activities, there exists a continuing need for improved devices, as well as methods for their manufacture.

BRIEF SUMMARY

The scrubbing product of the invention may be a multi-layer product and generally includes at least two distinct layers, e.g., a base substrate layer and a scrubby abrasive layer attached, adhered, or bonded to a face of the substrate layer (e.g., the scrubby abrasive layer may be on one face of the base substrate layer). In some embodiments, the base substrate layer may include an absorbent fibrous layer comprising cellulosic materials. Where such an absorbent layer is provided, this may be sandwiched between additional layers (e.g., synthetic layers) of the base substrate layer, adjacent another layer, or otherwise provided. In some embodiments a non-polar synthetic layer may provide relatively better bonding with a non-polar scrubby abrasive layer, so that in at least some embodiments, a non-polar synthetic layer providing good bonding with the scrubbing layer may be disposed between the scrubby layer and a polar absorbent layer.

In one embodiment, the scrubby layer comprises discontinuous polymeric globules (rather than true fibers or filaments) that have varying shapes and lengths and that cover at least a portion of the surface (e.g., front or back face) of the base substrate layer. During the formation of the scrubby layer, the molten polymeric resin material may be extruded or otherwise dispensed in such a manner to result in "spitting" and formation of irregular globule lengths and shapes, resulting in an abrasive polymer spray which is applied to the base substrate layer. In such an embodiment, the globules spit from the nozzle are relatively short, discontinuous, and irregular in thickness (e.g., diameter), and cross-section. In an alternative embodiment, the molten polymeric resin material may be dispensed under similar conditions, but the result is formation of a substantially continuous or discontinuous string or chain pattern of fibers having irregular cross-sections and irregular thickness (e.g., diameters) along a length of the pattern, as it is applied to the base substrate layer. The strings or chains of such a pattern may be a pattern that is substantially linear, high frequency, and low amplitude, resembling the plotted output of a seismometer or seismograph.

The processes for addition of a scrubby layer may be employed in-line, e.g., in the same production line process as used to make the base substrate layer itself (e.g., a non-woven wipe). The addition of a scrubby layer may be the last step in such an in-line process, or near the end of such process (e.g., so that no heat treatments such as heat embossing, heat sealing, curing, or elevated temperature drying steps follow application of the scrubby layer). An embodiment of an in-line process may include melting a polymer resin material, and extruding or otherwise dispensing the molten polymer resin through one or more orifices of a heated nozzle into a stream of hot inert gas (which may simply be air) which attenuates the molten resin into globules (e.g., elongated globules) that form a sprayed stream of such globules. Because the nozzle "spits" out the globules during such extrusion or dispensing, the globules may generally be discontinuous, separated one from another as they travel between the nozzle and the base substrate layer, provided the distance between the nozzle and base substrate layer allows their separation. The created abrasive globules may have an irregular cross-section and/or irregular thickness (e.g., diameter) along a length of the globules. The globules are collected onto at least a portion of the surface of the base substrate layer, and upon cooling and solidification of the molten polymer resin, they are abrasive, providing a rough, scrubby texture. A spacing between the one or more orifices of the nozzle and the base substrate layer may be less than 6 inches (e.g., from 2 to 6 inches), which aids in globule adhesion to the base substrate. In one embodiment the output of the molten polymer resin is rather "spit" as discontinuous, relatively short, globules that adhere to the base substrate. In an alternative embodiment of the invention, the molten polymer resin forms continuous or discontinuous fibers which are deposited onto the base substrate layer in a substantially linear, high frequency, low amplitude pattern to create an abrasive scrubby layer on the surface of the base substrate layer.

Another in-line process is directed to a process for producing a multi-layer scrubby substrate, including melting a polymer resin material, and extruding or otherwise dispensing the molten polymer resin through a plurality of orifices of a heated nozzle into a stream of hot inert gas which attenuates the molten resin into abrasive fibers that then form a stream of such abrasive fibers. The abrasive fibers are deposited onto at least a portion of a face (e.g., the front or back face) of a base layer substrate layer in a substantially linear, high frequency, low amplitude pattern (e.g., resembling the plotted output of a seismometer or seismograph) to create a scrubby layer on the face of the base substrate layer. In one embodiment of the invention, the distance between the nozzle orifice(s) and the base substrate layer is very short (e.g., less than 1 inch, less than 3 inches, etc.).

The scrubby layer may be further attached to an absorbent layer (e.g., of the base substrate layer). For example, without use of any separate binder, the molten polymer resin material itself may bond to the base substrate layer. In one embodiment, the scrubby layer is free of binders. In another embodiment, the entire scrubby substrate, including the scrubby layer and one or more layers of base substrate materials, is free of binders. The base substrate layer itself may include multiple layers—e.g., it may include an absorbent layer (e.g., cotton, or other cellulose pulp material), and one or more synthetic layer (e.g., polypropylene, polyethylene, etc.). In one embodiment, the base substrate material comprises three layers, a first layer of spunbond polypropylene material, and a middle layer of airlaid cellulose pulp material and a third layer of spunbond polypropylene, which altogether makes a base substrate. In this embodiment, when the three layers are joined together, the cellulose pulp material may be pushed into one of the spunbond layers which blurs the two of the layers together when the entire substrate is bound together (e.g. by hydroentangling, needling, etc.). In one embodiment, it may be desirable to have the molten polymer resin material adhere to the spunbond layer that does not have the cellulose pulp materials pushed into it. Alternatively, the molten polymer resin may adhere well to mixed or blended substrate layer where a synthetic layer has some cellulosic materials that have been pushed into the synthetic layer. For example, the blended substrate layer may be a polypropylene and cellulose pulp material where the cellulose pulp material makes up less than 50% of the mixed layer by weight, preferably less than 40% by weight, more preferably less than 30%, most preferably less than 20% by weight. Matching the polarity between the polymer resin material and the synthetic material in the surface of the base substrate layer to which the molten polymer resin is applied results in a strong bond, which resists the cooled polymer resin being flaked off by a fingernail or during use.

The invention further relates to scrubby substrates formed by such processes. A formed scrubby substrate may include a base substrate layer, and an abrasive layer on the base substrate layer. The abrasive layer may include (i) an abrasive string or chain of abrasive fibers forming a substantially linear, high frequency, low amplitude pattern that covers a portion of the base substrate layer (e.g., resembling the plotted output of a seismometer or seismograph), or (ii) a plurality of abrasive globules (e.g., elongated globules) having an irregular cross-section, and irregular thickness (e.g., diameter) along a length of the globules, wherein the abrasive globules cover a portion of the base substrate layer. The scrubby substrate may further include an absorbent layer (e.g., in the base substrate layer). A cleaning composition may be loaded in or onto the scrubby substrate. In some embodiments, such abrasive layers may not cover the entire surface area of a given face of the base substrate layer to which they are applied. For example, they may be applied as a relatively narrow stripe across only a portion of the base substrate layer (e.g., across a mid-section thereof).

Further features and advantages of example embodiments of the present invention will become apparent to those of ordinary skill in the art in view of the detailed description of preferred embodiments below.

BRIEF DESCRIPTION OF THE DRAWINGS

To further clarify the above and other aspects of example embodiments of the present invention, a more particular description of the invention will be rendered by reference to specific embodiments thereof which are illustrated in the drawings located in the specification. It is appreciated that these drawings depict only exemplary embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

I. Definitions

Figure 1:
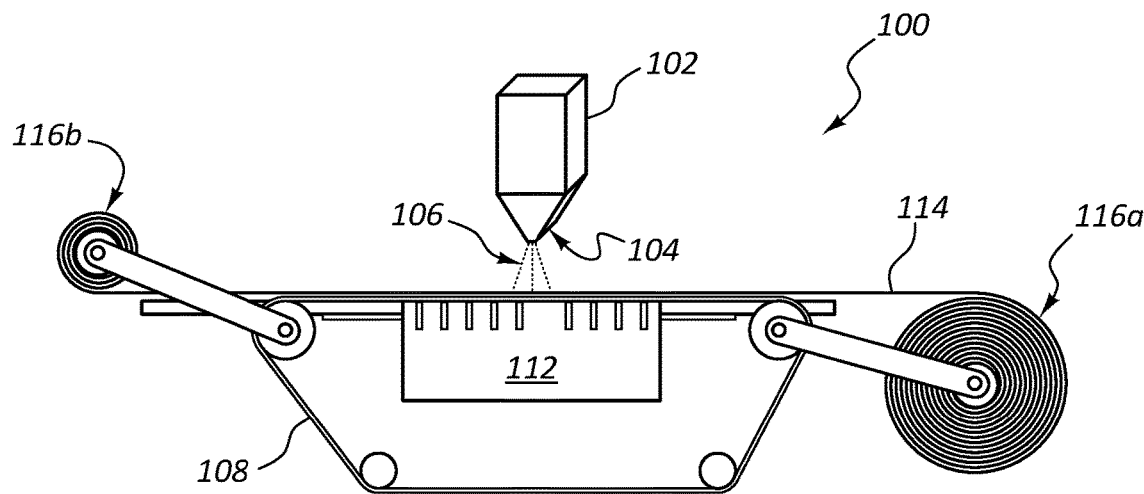
FIG. 1 shows a schematic view of an exemplary in-line process that may be used in embodiments of the present invention.

Before describing the present invention in detail, it is to be understood that this invention is not limited to particularly exemplified systems or process parameters that may, of course, vary. It is also to be understood that the terminology used herein is for the purpose of describing particular embodiments of the invention only, and is not intended to limit the scope of the invention in any manner.

All publications, patents and patent applications cited herein, whether supra or infra, are hereby incorporated by reference in their entirety to the same extent as if each individual publication, patent or patent application was specifically and individually indicated to be incorporated by reference.

The term "comprising" which is synonymous with "including," "containing," or "characterized by," is inclusive or open-ended and does not exclude additional, unrecited elements or method steps.

The term "consisting essentially of" limits the scope of a claim to the specified materials or steps "and those that do not materially affect the basic and novel characteristic(s)" of the claimed invention.

The term "consisting of" as used herein, excludes any element, step, or ingredient not specified in the claim.

As used in this specification and the appended claims, the singular forms "a," "an" and "the" include plural referents unless the content clearly dictates otherwise. Thus, for example, reference to a "surfactant" includes one, two or more surfactants.

Unless otherwise stated, all percentages, ratios, parts, and amounts used and described herein are by weight.

Numbers, percentages, ratios, or other values stated herein may include that value, and also other values that are about or approximately the stated value, as would be appreciated by one of ordinary skill in the art. A stated value should therefore be interpreted broadly enough to encompass values that are at least close enough to the stated value to perform a desired function or achieve a desired result, and/or values that round to the stated value. The stated values include at least the variation to be expected in a typical manufacturing or formulation process, and may include values that are within 10%, within 5%, within 1%, etc. of a stated value. Furthermore, the terms "substantially", "similarly", "about" or "approximately" as used herein represent an amount or state close to the stated amount or state that still performs a desired function or achieves a desired result. For example, the term "substantially" "about" or "approximately" may refer to an amount that is within 10% of, within 5% of, or within 1% of, a stated amount or value.

Some ranges may be disclosed herein. Additional ranges may be defined between any values disclosed herein as being exemplary of a particular parameter. All such ranges are contemplated and within the scope of the present disclosure.

In the application, effective amounts are generally those amounts listed as the ranges or levels of ingredients in the descriptions, which follow hereto. Unless otherwise stated, amounts listed in percentage ("% s") are in weight percent. For cleaning compositions, such percentages are based on 100% actives of the cleaning composition.

As used herein, the terms "nonwoven" or "nonwoven web" means a web having a structure of individual fibers or threads which are interlaid, but not in an identifiable manner as in a knitted web. Nonwoven webs may be formed from many processes, such as, for example, meltblowing processes, spunbonding processes, spunlace processes, airlaid processes and bonded carded web processes. The particular method for fiber lay down for the base substrate layer of the present multilayer scrubby substrate cleaning articles is not particularly limited. The base substrate layers described herein may be nonwoven webs.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, the preferred materials and methods are described herein.

II. Introduction

In an aspect, the present invention is directed to in-line processes for producing scrubby substrates, and related scrubby substrate cleaning articles (e.g., non-woven wipes with a scrubby layer applied thereto). While the in-line process may exhibit superficial similarities to meltblowing processes, various parameters of the process are different from traditional meltblowing processes in important ways, which provide for very different finished characteristics in the finished scrubby substrate cleaning article formed thereby. One embodiment, the inventive process includes melting a polymer resin material, and extruding or otherwise dispensing the molten polymer resin through one or more orifices of a heated nozzle, into a stream of hot inert gas (e.g., air), which attenuates the molten resin, so that the resin forms into elongated globules (rather than fibers or filaments). Such created globules may have irregular cross-sections and/or irregular thickness along a length of the globules. The globules are collected onto at least a portion of a base substrate layer. While in typical meltblowing processes, the distance between the nozzle orifice(s) and the base substrate layer is approximately a foot or more, the present process brings the nozzle much closer to the base substrate layer (e.g., less than 6 inches therebetween). In one embodiment of the invention, the molten resin forms elongated globules (rather than fibers or filaments) and the globules are collected on the base substrate layer. The globules may be deposited as substantially discrete, separate, discontinuous globules onto the base substrate layer. Alternatively, the molten resin may be formed into substantially continuous or discontinuous string or chain pattern of abrasive fibers, exhibiting a high frequency, low amplitude substantially linear pattern on the base substrate.

In either case, such elongated globules or abrasive fibers have been found to provide a better scrubby, abrasive top layer, as compared to depositing the same material on the base substrate layer in the form of typical meltblown fibers or filaments. The uneven, irregular, discontinuous characteristics of the "spit" globules provides a better rough scrubby surface, with improved abrasivity over other commercially available scrubby substrates. As such, the present scrubby substrates including abrasive globules or abrasive fibers exhibit higher abrasivity as compared to other wipes that may include a meltblown material. Such typical meltblown wipes may include a base layer with a meltblown polymer disposed thereover that resembles spider web. An example of such processes and articles is described in U.S. Pat. No. 7,994,079, herein incorporated by reference in its entirety. "Lysol Dual Action Disinfecting Wipes" is another example of such a product having a spider web appearance. Such products are not as abrasive as those described herein.

In some embodiments, the collection of globules on the base substrate layer results in a pattern (e.g., a random pattern) of short, discontinuous globules deposited onto the base substrate layer, as a result of the discrete globules being "spit" from the nozzle, so as to strike the base substrate layer surface, and bond thereto as the molten polymer resin cools. The globules may in some embodiments be elongated, but far shorter than typical fibers or filaments produced by typical meltblowing and similar processes. For example, such discontinuous globules may have an average length that is less than 10 mm, less than 8 mm, less than 5 mm, less than 4 mm, less than 3 mm, or less than 2 mm, as seen in FIGS. 3A-3E.

Where the nozzle is very close to the base substrate layer so that a high frequency low amplitude chain or string pattern is produced as in FIGS. 4A-4E, the fibers may be continuous one with another, but oriented in a way to produce the high frequency, low amplitude pattern across the substantially linear string or chain. The average amplitude along the chain or string may be less than 10 mm, less than 8 mm, less than 5 mm, less than 4 mm, or less than 2 mm. The amplitude is measured as the distance between the peaks in the pattern. Average frequency of the pattern may be from 0.1 $mm^{-1}$ to 5 $mm^{-1}$, from 0.25 $mm^{-1}$ to 2 $mm^{-1}$, or from 0.5 $mm^{-1}$ to 1.5 mm. For example, an inventive wavy pattern may have a frequency of about 1.5 mm, with the amplitude being about 6 mm and a ratio of amplitude to frequency of about 4. In the wavy line example, the distance from the center to center of the peaks is about 6 mm. In a higher frequency inventive example, the frequency may be about 0.125, the amplitude would be about 0.3 mm and the ratio of amplitude to frequency would be about 2.4. In the high frequency example, the distance from the center to center of the peaks is about 0.5 mm.

III. Exemplary In-Line Processes

Figure 2:
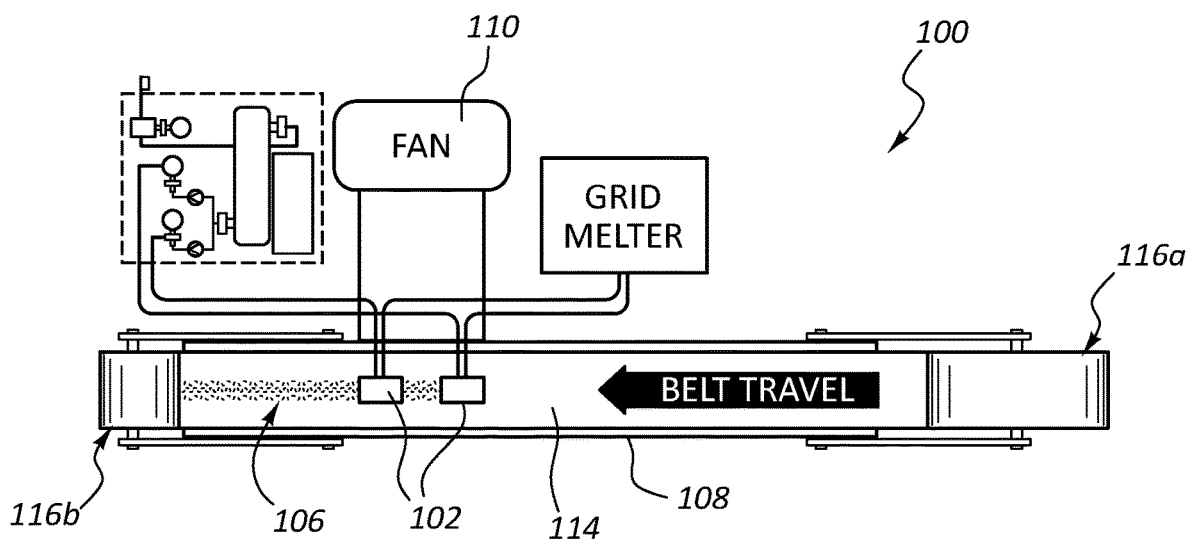
FIG. 2 shows another schematic view of an exemplary in-line process that may be used in embodiments of the present invention.

FIGS. 1-2 schematically illustrate an exemplary in-line process that may be used according to an embodiment of the present invention. FIG. 1 shows a pilot system that was employed in such an in-line process. Such system 100 includes a spray head nozzle 102 including one or more orifices 104 through which molten polymer resin material 106 may be extruded or otherwise dispensed (e.g., sprayed). A conveyor 108 is shown, which may include a foraminous belt, wire or other conveyed surface. Such a belt, wire or other conveyed surface may include removable slats or portions, and a vacuum box 112, with a blower or fan 110 (e.g., a variable speed fan or blower). FIG. 2 shows the blower or fan 110, while FIG. 1 shows vacuum box 112. The terms fan and blower may be used interchangeably herein.

As shown in FIGS. 1 and 2, the base substrate layer 114 may be formed as a web through any desired process (e.g., any process for forming a non-woven substrate suitable as a wipe). The web of base substrate layer 114 may be provided as a wound web or roll of material on one side of the conveyor, at 116a, as seen in FIG. 1. Base substrate layer 114 may be unwound (e.g., with tension control), and drawn across conveyor belt 108, to be rewound, at 116b. Between unwinding 116a and wind-up at 116b, base substrate layer 114 is drawn past orifices 104 of nozzle 102, where molten polymer resin 106 is extruded, sprayed, or otherwise dispensed, and collected onto base substrate layer 114. The one or more nozzles 102 (and orifices 104) have limited, if any movement as the base substrate layer 114 is drawn thereunder. As a result, the footprint of such extruded, sprayed or otherwise dispensed molten polymer resin may be limited, covering only a portion of the face of the base substrate layer. The molten polymer resin cools, and adheres or bonds to the base substrate layer. Preferably, no binder is needed to achieve good attachment, bonding or adhering of the polymer resin to the base substrate layer. The terms bonding, attachment, and adhering are used interchangeably herein.

It has been found that good bonding can be achieved where care is taken in matching the polarity of the polymer resin and the surface of the base substrate layer to which the polymer resin is being applied. Such a bond will resist flaking off or otherwise being removed during normal use, by picking with a fingernail, or the like. For example, many polymer resin materials that might be used to provide the abrasive globules of the abrasive layer may be non-polar. Examples of suitable non-polar materials include polypropylene (PP), polyethylene (PE), high-density polypropylene, low density polypropylene, polyvinylidenes, and thermoset resins such as polyimides and silicone resins. Combinations or copolymers of any resins may be employed.

When using a non-polar resin polymer, it may be preferred that at least the top face of the base substrate layer (where the molten resin is being applied) also be non-polar, or at least comprise a significant fraction of non-polar material, so as to provide for good adhesion of the two structures. For example, the base substrate layer may comprise the same material as the molten polymer resin (e.g., PP on PP). Other synthetic non-polar materials may also be suitable for use. Generally, matching of polarity will aid in ensuring good adhesion between the two components.

It is also possible to employ polar polymer resins (e.g., when depositing onto a polar surface). Examples of polar polymer resins include, but are not limited to polyvinyl chloride, polystyrene, polycarbonate, polymethyl methacrylate, and thermoset polymers such as polyesters (PET), polyamides (nylon), polylactic acid (PLA), polyurethane, polyurea, viscose, rayon, and epoxy resins. Combinations or copolymers of any such polymer resins may be employed.

In some embodiments, it may be desirable for the base substrate layer to include a pulp material (e.g., natural cellulose from cotton or other natural sources). By way of example, pulp may be a lignocellulosic fibrous material, and may be provided by separating cellulose fibers from wood, waste paper (e.g., recycled paper), fiber crops (e.g., cotton), or other suitable sources. Such a pulp material is typically polar. Thus, if such pulp is included in the base substrate layer, it may be included in a manner so as to still provide a significant fraction of non-polar (e.g., many synthetic materials) material at the face where bonding with a non-polar molten polymer resin is to occur, or by employing a polar molten polymer resin. For example, polyethylene terephthalate (PET) may be employed as a polar polymer resin material, which may exhibit acceptable bonding to pulp. Other materials that may be used include, as described above. Generally, any of the polymer resin materials may be suitable for use in the nonwoven base substrate layer or the molten polymer resin (which becomes the abrasive layer).

It may be possible to achieve acceptable adhesion between a non-polar polymer resin material, such as polyethylene, and a polar substrate layer (such as PET), by adding an organic acid (e.g., maleic acid) to the polymer resin material. Those of skill in the art may appreciate other ways to achieve desired adhesion between materials of differing polarities, without having to resort to use of a separate binder.

In an embodiment, the base substrate layer may include multiple layers itself. For example, it may include a pulp layer (which is advantageous for its absorbency), and a synthetic non-polar layer, where a substantial fraction of the synthetic non-polar layer is provided at the face of the base layer to which the polymer resin is to be applied. An exemplary base substrate layer may include 3 layers, e.g., two synthetic non-polar layers, with a pulp layer sandwiched therebetween, where the layers are heat sealed or heat embossed together. As described herein, any such heat sealing or other heat treatments may be performed prior to application of the polymer resin which becomes the abrasive layer, in order to prevent remelting, or softening of the polymer resin, which may reduce the abrasiveness of such layer.

In a 2-layer base layer substrate including a pulp absorbent layer and a synthetic layer, care may be taken to ensure that the polymer resin material is applied and bonded to the face where matching polarity can be provided.

Application of the molten polymer resin may be the last step performed in the in-line process, or at least the last step involving application of heat to the scrubby substrate product. For example, any heat embossing, heat sealing, drying (by application of heat), curing, or other heat treatments should be performed prior to application of the molten polymer resin to the base substrate layer to ensure that the scrubby texture of the polymer resin globules is preserved. Other in-line processing steps that do not involve application of heat may follow application of the molten polymer resin, such as loading a cleaning composition in or onto the base substrate layer of the scrubby substrate. Where desired, such loading could be performed prior to, or after application of molten polymer resin application. In some embodiments, a cleaning composition may be loaded onto a base substrate layer, which may then be cut and stacked and packaged (e.g., as a rectangular stack of wipes). In other embodiments, the base layer substrate may be scored (to allow individual wipes to be torn off) and then rolled into a "donut", packaged (e.g., in a cylindrical canister), and dosed with the cleaning composition.

By in-line, it is meant that the process may be performed in the same production line process as the other manufacture steps, so that it is not required to pull base substrate layer material from one production process, and move it to another production line for application of the molten polymer resin. Rather, such application may be performed in-line with the other manufacture processes, all within the same production line. For example, the production line may include steps for producing a non-woven base substrate layer, including heat sealing or heat embossing multiple layers of such base substrate layer, steps for applying a scrubby abrasive layer as described herein to the base substrate layer, steps for loading a cleaning composition in or onto the base substrate layer, and steps for cutting or scoring the base layer substrate and packaging the resulting stack or donut of wipes.

Returning to FIGS. 1 and 2, ITW Dynatec is an example of a suitable dispensing system for extruding, spraying, or otherwise dispensing the molten polymer resin material. Of course, it will be appreciated by those of skill the art that various other systems can be employed, using operation parameters as described herein.

Typical meltblowing processes use a very high melt flow rate ("MFR"). MFR is a common parameter used to describe the flowability of polymers. MFR values are typically given as grams/10 minutes. Meltblowing processes typically operate at MFR values of from 500 to 1200 (g/10 min). Spunbond polymers are typically delivered at relatively low MFR values, e.g., from 30 to 70 (g/10 min). According to the present processes, the MFR value may be from 35 to 400, from 75 to 400, from 80 to 300, from 80 to 200, from 80 to 150, for example, 35, 75, 80, 90 100, 110, 125, 150, or the like. In Examples 1 and 2 below, the MFR was 100 (g/10 min). In one embodiment of the invention, these processing conditions have been found to create the desired level of "spitting", which does not result in fiberization of the polymer (as occurs with typical spunbond and meltblowing processes). The stream emitted from the nozzle orifice(s) 104 may be characterized as being formed of globules having inconsistent cross-sections, and inconsistent lengths of globules that are "spit" from the nozzle orifice(s), where sufficient distance is provided between the nozzle and the base substrate layer to allow the globules to separate.

In addition to differences in MFR, in typical processes where formation of typical meltblown fibers and filaments is desired, the MFR relative to the rate at which the nonwoven base substrate layer is drawn is about 14:1. In the present processes, the base layer substrate may be drawn at a much slower relative rate (i.e., a lower ratio than the typical 14:1).

For example, such ratio may be less than 13, less than 12, less than 11, or less than 10. The linespeed at which the base substrate layer is drawn may be from 10 to 100 ft/min, from 20 to 60 ft/min, or from 40 to 50 ft/min. By way of Example, the base substrate layer in Examples 1 and 2 were drawn at 45 ft/min.

A related parameter is the grams (of molten polymer resin) per orifice (or hole) per minute ("GHM"). Typical meltblown processes employ a GHM value of about 0.3, such as described in U.S. Pat. No. 7,994,079. The present processes employ GHM values that may be significantly higher than such typical meltblowing processes. For example, the GHM value may be from 1 to 8, from 2 to 7, or from 3 to 5 grams per hole per minute.

Another difference in processing parameters as compared to typical processes where formation of typical meltblown fibers and filaments is desired is the distance between the nozzle orifice(s) and the base substrate layer which acts as the collector for the sprayed molten polymer resin. In typical processes, this distance is 11 inches or more. In the present processes, such distance may be less than 8 inches, less than 6 inches, less than 5 inches, less than 4 inches, less than 3 inches, less than 2 inches, less than 1 inch, from 2 inches to 6 inches, or within any range between any of the forgoing values. Example 1 described below was carried out at a distance of 3 inches. Example 2 was carried out at a distance of 0.25 inch. Example 3 was carried out at a distance of 1.25 inch.

Another difference in processing parameters relates to the temperature of the air or other inert gas (e.g., nitrogen) that is drawn in a direction generally parallel to the trajectory of the sprayed molten polymer resin. Typically, such air is at least 50° F. hotter than the molten polymer resin. In the present methods, the difference may be less significant (e.g., up to 40° F., up to 30° F., or up to 20° F. hotter).

Another difference in processing parameters relates to the pressure of the air or other inert gas (e.g., nitrogen) that is drawn in a direction generally parallel to the trajectory of the sprayed molten polymer resin. In the present methods, this pressure is higher than typically employed in meltblowing processes. For example, the pressure may be at least 30 psi, at least 35 psi, at least 40 psi, at least 45 psi, at least 50 psi, from 30 psi to 100 psi, from 35 psi to 70 psi, or from 35 psi to 55 psi. Such higher pressure is believed to aid in separating the globules into short, discrete, discontinuous fragments, to allow such separation prior to striking the base substrate layer.

Some exemplary comparison parameter values comparing an exemplary scrubby substrate production process with process parameters of U.S. Pat. No. 7,994,079 (the K-C Patent) are shown in Table 1. The K-C Patent employs 0.3 mm, 30 hpi orifices using 70 MFR PP to get 70 to 485 micron aggregate fibers. Typical meltblown processes have MRF values in the 500-1200 range, but both the K-C patent and the present invention use low MFR resins. In the K-C Patent, the air pressure was only about half that used in the present processes.

TABLE 1

| K-C Patent | Parameter | Scrubby Substrate Process |
|---|---|---|
| 11.5 | Inches of active width | 1.6 |
| 30 | Holes (orifices) per inch | 5 |
| 345* | Holes (orifices) | 8 |
| 10 | Feet per minute | 20 |
| 1380* | in$^2$/min | 384 |

TABLE 1-continued

| K-C Patent | Parameter | Scrubby Substrate Process |
|---|---|---|
| 0.890* | m²/min | 0.25 |
| 120 | GSM | 170 |
| 106.7* | g/min | 42.1 |
| 0.31* | GHM | 5.26 |

*calculated from values provided.

The polymer 106 is extruded or otherwise dispensed through small orifices, although the orifice sizes employed are much larger than standard meltblowing orifices. For example, while typical meltblowing processes may employ an orifice size of 0.3 mm, the present orifices may have a length, width, or diameter of at least 0.4 mm, from 0.4 mm to about 1 mm, or from 0.4 mm to 0.6 mm. The present orifices may be square, or rectangular, although of course circular is also possible. For example, the orifices employed in Examples 1 and 2 measured 0.5 mm by 0.6 mm. As the polymer leaves the orifice 104, it is subjected to high velocity heated air (e.g., provided by blower 110) that flows in the same direction as extrusion. For example, the vacuum box 112 may pull such heated air down, in the general direction of the trajectory of molten polymer 106 spit from orifice(s) 104. The heated air draws out the polymer 106 and propels it towards the base substrate layer 114. The temperature of the drawn air should be close to or somewhat above the extrusion temperature in order to not cool off the tip. In a typical meltblown or adhesive spray process that seeks to achieve fiberization, the temperature of the drawn air is significantly higher than the extrusion temperature of the resin. For example, typically, the temperature of the drawn air in a meltblown process is at least 50° F. hotter than the extrusion temperature of the resin. As described above, the temperature differential in the present processes is not so great (e.g., up to 30° F., or up to 20° F.).

The pattern of the polymer spray is determined at least in part by air pressure, polymer flow rate, distance between the nozzle orifice 104 and the collector (i.e., base substrate layer 114), and the vacuum settings of vacuum box 112. The distance between the nozzle orifice 104 and the collector is particularly important in determining the resulting pattern. The pattern of the polymer spray may be altered and varied by changing these parameters. As described above, in typical meltblowing, spunbonding, or other processes, the intent is to create a stream of molten polymer resin material that is in the form of fibers or filaments having uniform a diameter along the length of the fibers or filaments. Those of skill in the art would of course avoid changes to the process parameters that would change the form of the emitted material from uniform fibrous or filament to something else, as this was thought undesirable.

If desired, an abrasive particulate material (e.g. silica, silicates, aluminum oxide, etc.) may also be added to the polymer spray to be deposited onto the base substrate layer, with the molten polymer resin material. Such abrasive particulates may be entrained within the flow of the molten polymer material through the nozzle, or may be added to the spray after it leaves the orifice 104. For example, the particulates may be added as the molten polymer resin material exits the orifice 104, before it strikes base substrate layer 114, or may be sprinkled or otherwise applied to the molten polymer resin material on the base substrate layer before it fully cools.

While some such particles may fall off the base substrate layer, or otherwise not become stuck within the molten polymer resin globules, sufficient abrasive particles can become stuck within the molten resin to increase the abrasiveness of the resulting scrubby substrate product. One advantage of adding the abrasive particulate after nozzle 102 may be to reduce wear on the nozzle 102 due to abrasive being run therethrough. Addition of abrasive particulates may be achieved later in the process, before the polymer resin has fully cooled. Such may include, but are not limited to, addition during substrate winding (e.g., about 116b in FIGS. 1-2), during a process for creating interleaved substrate stacks, or during a process for attaching multiple layers of substrate articles together. Although perhaps less preferred, even if the polymer resin has cooled, it may be possible to still add abrasive particulates by using a binder that may be sprayed or otherwise applied over the scrubby substrate.

Any added abrasive material may have a Mohs hardness value of from 3 or higher, e.g., from 4 to 10, particularly where targeting hard water soils for removal. In addition to the exemplary materials mentioned above, other possible abrasive particulate materials that may be added to the molten polymer include garnet, flint, pumice, calcium carbonate, silica, silicon carbide, other carbides, combinations thereof, and the like. Aluminum oxide, having a Mohs hardness value of 9, may be particularly suitable. Where included, such an abrasive may be included in an amount from 0.1% to 10%, from 0.25% to 8%, or from 0.5% to 5%. Higher or lower amounts may be included, as desired, depending on the abrasivity desired. No separate binder may be required, as the particulate material may be bound to the molten polymer resin material. The size of the abrasive particles may be as desired. By way of example, particle size may be up to 1000 μm, up to 500 μm, from 1 μm to 500 μm, from 10 μm to 300 μm, or from 50 μm to 200 μm. In testing that was performed, 70 μm calcined aluminum oxide particles were sprinkled into the stream of molten polypropylene as it was deposited onto the base substrate layer.

The scrubby substrates may be employed in scrubbing typical kitchen and bathroom surfaces (e.g., sinks, countertops, tile, and the like), as well as other uses where a scrubby substrate would be desirable. The polymer resin material itself may already typically have a Mohs hardness value of about 3-4. Where it is desired to remove hard water deposits, soils and stains, it may be desired that the abrasive have a hardness on the Mohs scale that is greater than the target soil to be removed. By way of example, calcium carbonate (a typical hard water soil) has a Mohs hardness value of 3. A particulate abrasive such as silica (Mohs hardness of 7), or aluminum oxide (Mohs hardness of 9), may be particularly effective in removing such hard water deposits or soils.

Another important factor in achieving the desired pattern (without formation of fibers or filaments) is the ability of the spray to stick to the nonwoven carrier web. As described above, incompatible polymers of different polarity do not provide good adhesion to one another. Even with such pairing, in a typical meltblown process, good adhesion of the sprayed polymer resin to the nonwoven base substrate layer is often difficult to achieve. It has been found that the short orifice to collector (base substrate layer) distance also increases adhesion as compared to longer distances. In other words, because the orifice(s) 104 and base substrate layer 114 are brought close together, it has been found that this also increases bond strength between the molten polymer resin and the base substrate layer.

Figure 3A:
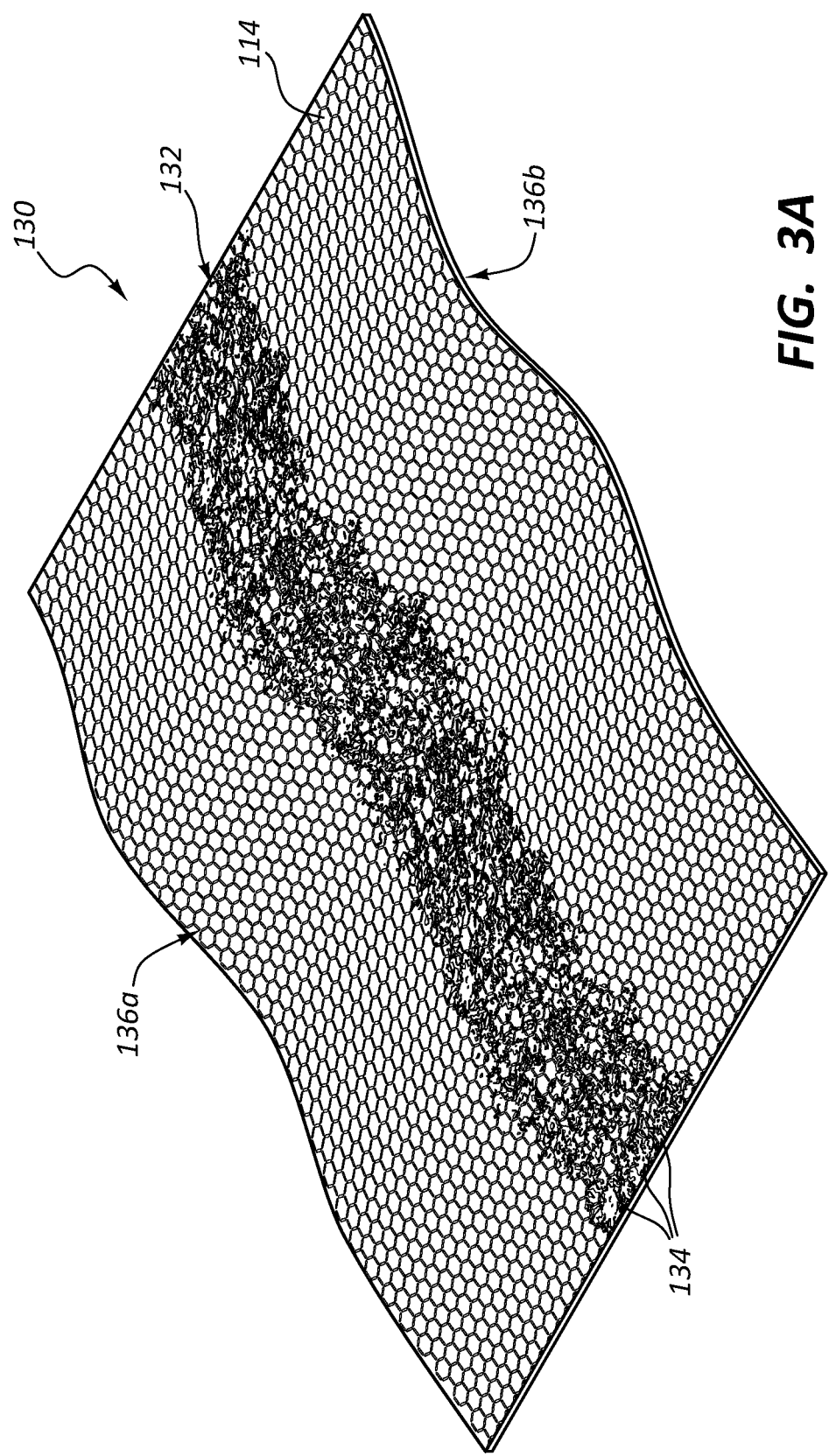
FIG. 3A shows a perspective view of an exemplary scrubby substrate configured as a wipe that includes a scrubby abrasive layer that has been spit-on to the base substrate layer of the wipe.
Figure 3B:
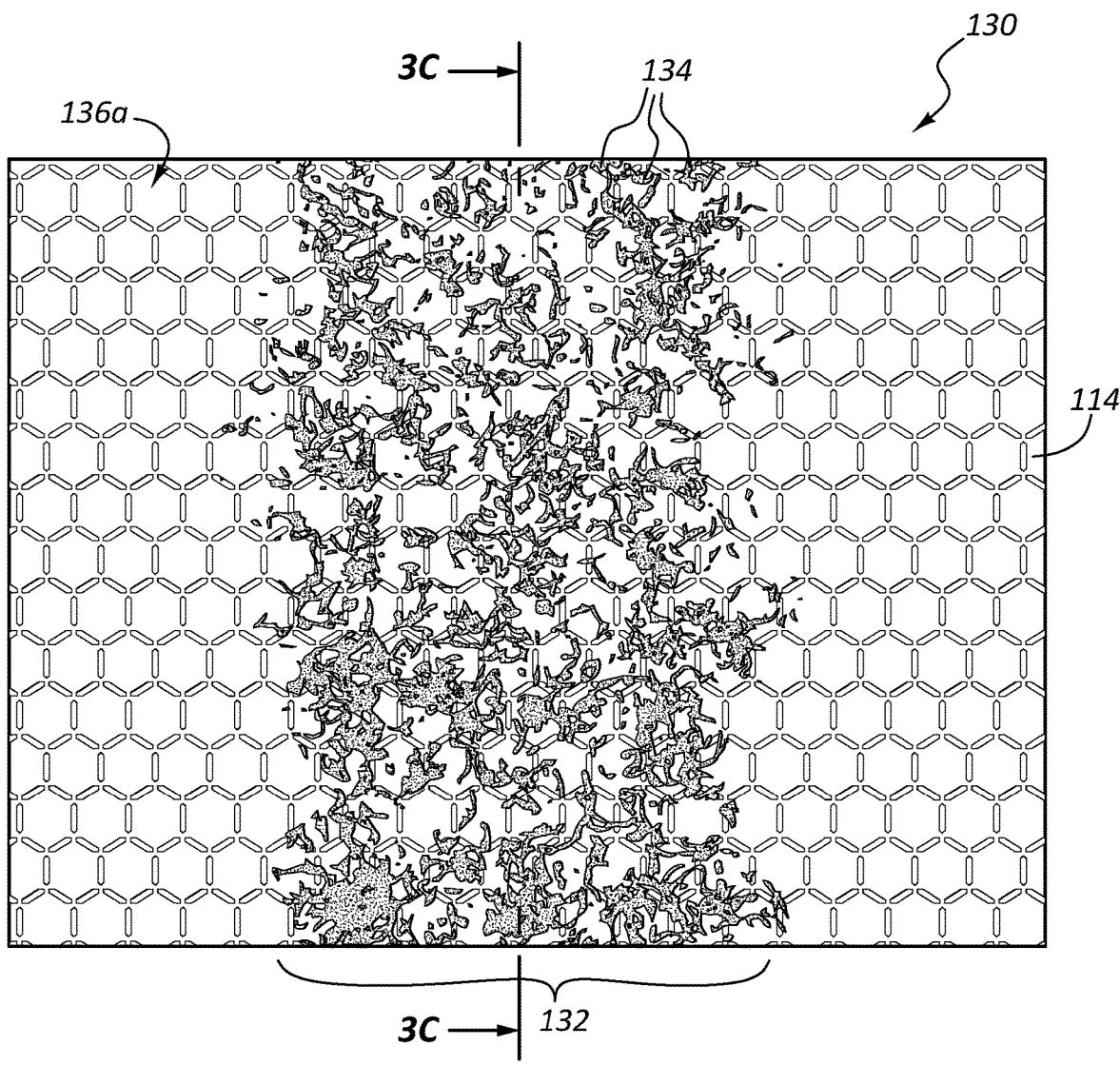
FIG. 3B shows a close-up perspective view of the scrubby substrate of FIG. 3A, showing how the scrubby layer is made up of discontinuous, short, fragmented globules.
Figure 3C:
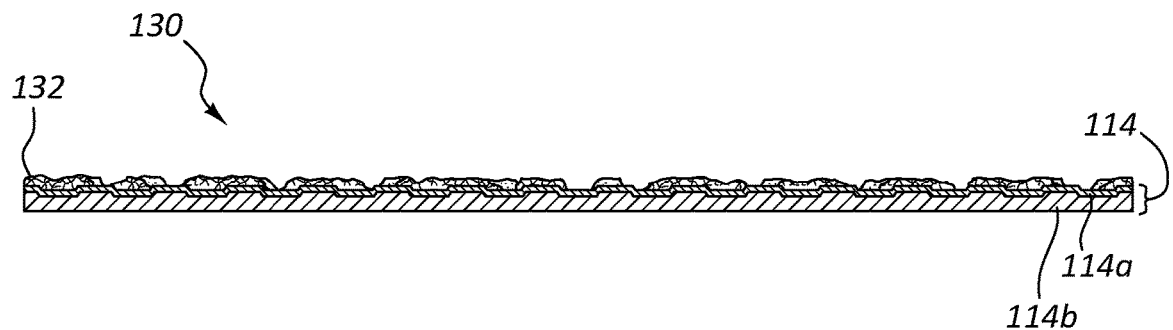
FIG. 3C shows a cross-sectional view through the wipe of FIG. 3A.

FIGS. 3A-3E illustrate an exemplary scrubby substrate 130 formed according to such processes as described herein. Scrubby substrate 130 includes a base substrate material 114, and an abrasive layer 132 on the base substrate material 114. Abrasive layer 132 includes a plurality of abrasive globules (e.g., elongated globules) 134. Globules 134 cover at least a portion of the first or top face 136a of base substrate layer 114. Base substrate layer 114 is generally 2-dimensional, exhibiting negligible thickness as compared to the length and width of the base substrate layer 114. In addition to top face 136a, base substrate layer 114 also includes an opposite, or bottom face 136b, opposite first face 136a. Of course, it will be appreciated that the top and bottom faces could be reversed (e.g., with abrasive layer 132 on the bottom face 136b). As shown in FIG. 3C, base substrate layer 114 may itself include multiple layers (e.g., a top synthetic non-polar bonding layer 114a and a pulp layer 114b).

As shown in FIG. 3A, the abrasive layer 132 may not cover the entire face 136a to which it is applied. For example, the overall footprint of abrasive layer 132 may only cover a portion of face 136a, leaving another portion of face 136a without any abrasive globules 134 adhered thereto. In the illustrated example, a stripe of abrasive particles 134 has been applied across a central, mid-section of first face 136a, with wholly uncovered regions on either side of abrasive layer 132. For example, the abrasive layer may cover less than 50%, less than 40%, or less than 30% of the surface area of face 136a. In another embodiment, higher fractions, or even the entire face 136a could be covered with abrasive layer 132, if desired. The opposite face 136b may include no abrasive layer 132, such that a portion of one face (stripe 132 of face 136a) of scrubby substrate 130 may be abrasive, while the opposite face (136b) may not be abrasive at all. The abrasive layer 132 may be at least moderately abrasive, e.g., it may be sufficiently abrasive that use on non-stick coated (e.g., TEFLON) pans would be undesirable (as it may remove such coating), but which would be particularly well suited for removing hard water deposits, soils, and the like. By way of example, the abrasivity of such layer (e.g., as measured in a Schiefer or similar abrasive test) may be between the "mildly abrasive" and "aggressively abrasive" characterization and results as described in U.S. Pat. No. 4,078,340, herein incorporated by reference in its entirety.

Figure 3D:
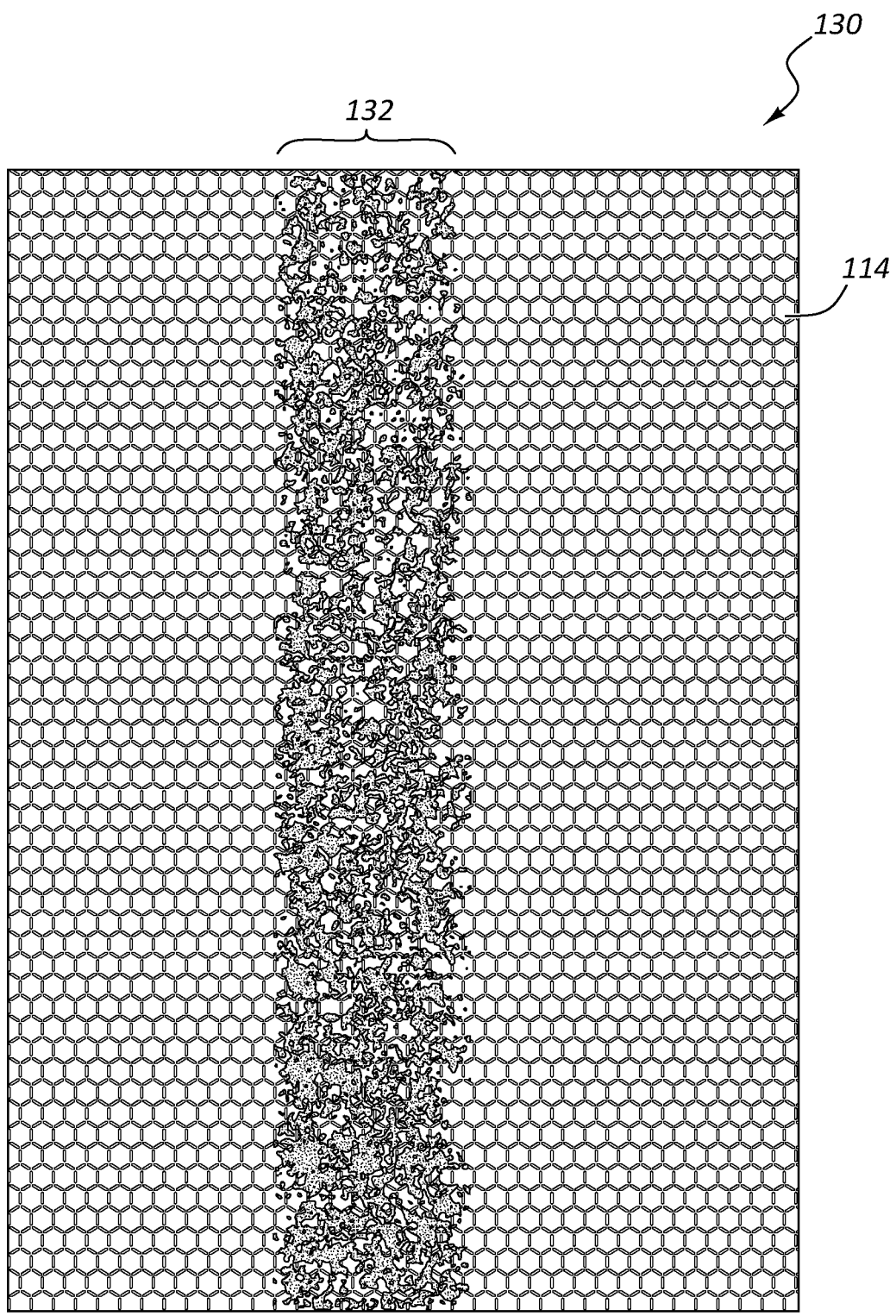
FIG. 3D is a photograph of an scrubby substrate similar to that of FIG. 3A, produced according to Example 1.
Figure 3E:
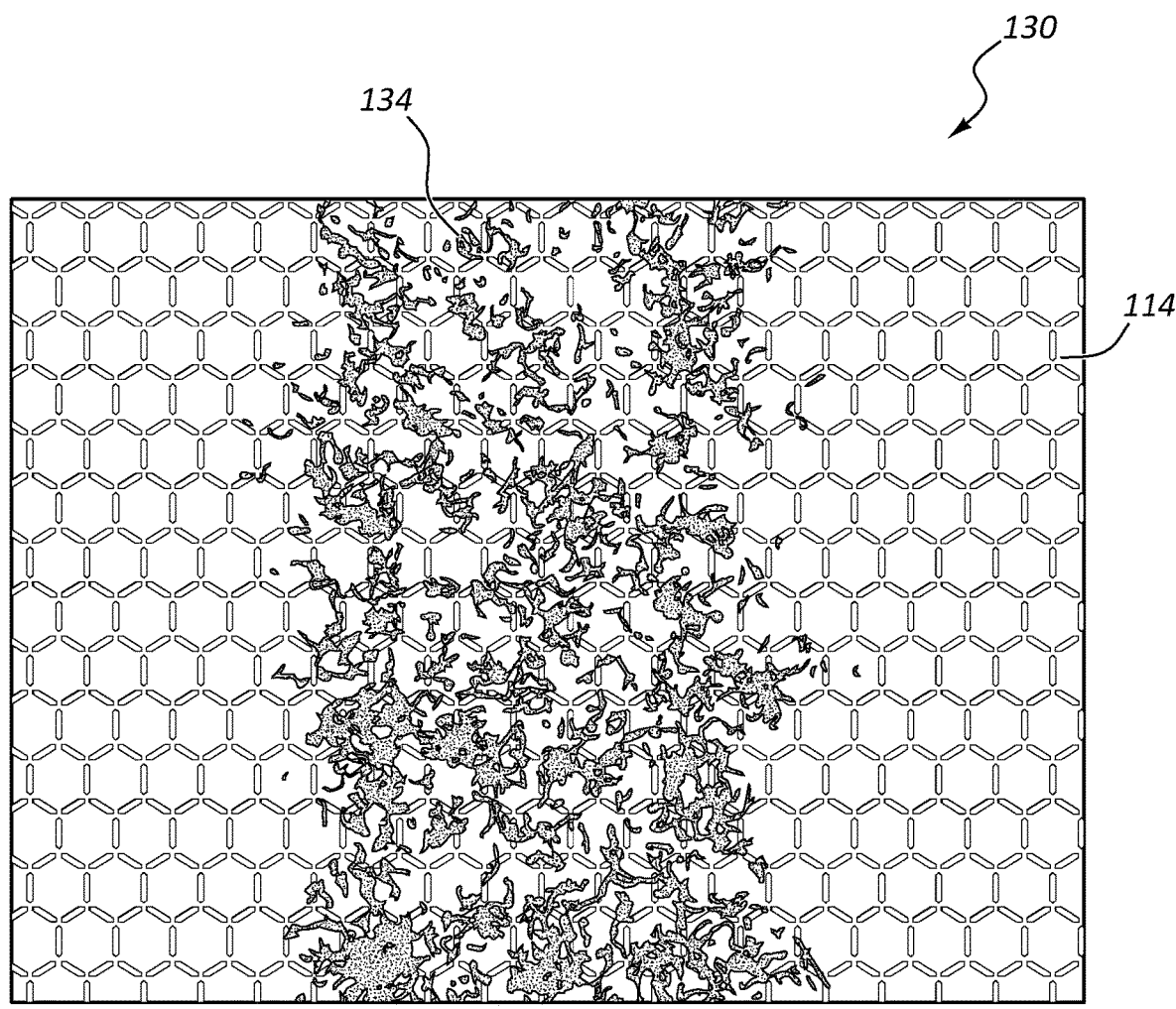
FIG. 3E is a close-up photograph of the scrubby substrate of FIG. 3D.

FIGS. 3B and 3C show close up, and cross-sectional views, respectively, through that portion of scrubby substrate 130 that includes the abrasive layer thereon. Base substrate layer 114 may be of one color (e.g., white), while the abrasive globules 134 may be of a contrasting color (e.g., blue, green, etc.). FIG. 3D is a photograph of an actual scrubby substrate produced according to Example 1, described below. FIG. 3E is a close-up photograph of the scrubby substrate of Example 1.

Figure 4A:
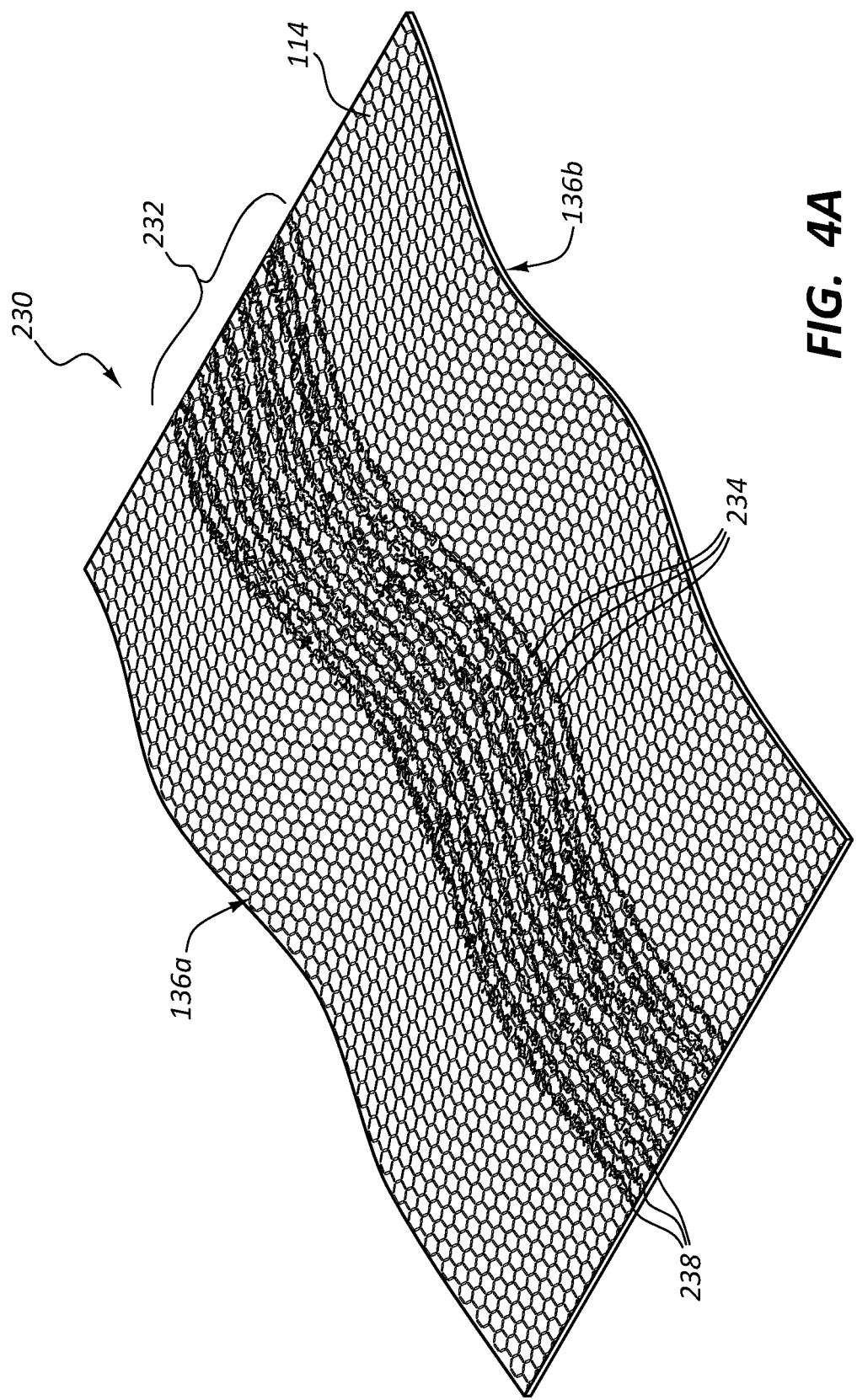
FIG. 4A shows a perspective view of another embodiment of a wipe including a spit-on scrubby layer.
Figure 4B:
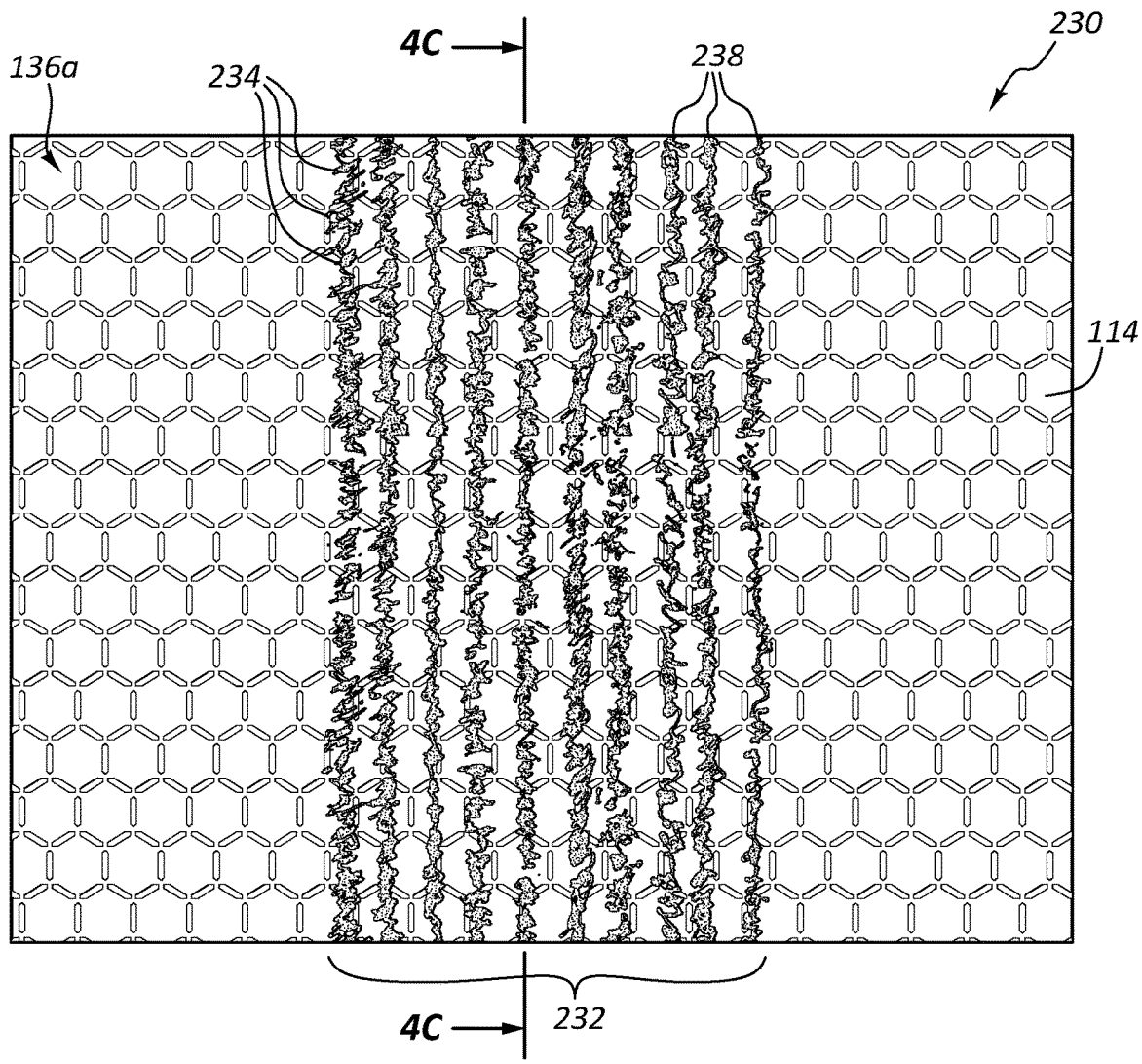
FIG. 4B shows a close-up perspective view of the wipe of FIG. 4A, showing how the scrubby layer includes a substantially continuous string or chain of polymer resin material that creates a high frequency low amplitude pattern that resembles the plotted output of a seismograph or seismometer.
Figure 4C:
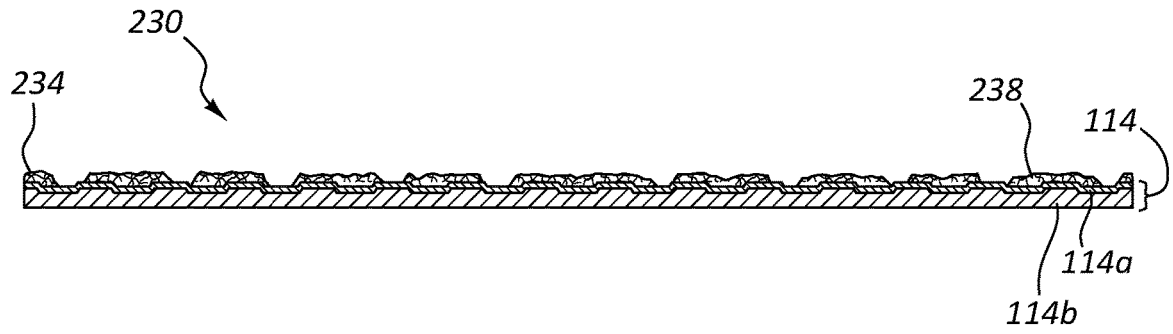
FIG. 4C shows a cross-sectional view through the wipe of FIG. 4A.

FIG. 4A shows a scrubby substrate 230 according to another embodiment. Scrubby substrate 230 is also configured as a wipe, and includes a base substrate material 114, including both a first or top face 136a, and an opposite face 136b. An abrasive layer 232 of abrasive fibers 234 is adhered to first face 136a. Instead of the abrasive globules being largely discrete, and disconnected from one another, as globules 134 of scrubby substrate 130, abrasive fibers 234 are applied as distinct abrasive strings or chains 138 of abrasive fibers 234, with each string or chain 138 forming a substantially linear (e.g., running left to right in FIG. 4A) high frequency, low amplitude pattern that covers a portion of base substrate layer 114. For example, in FIG. 4A, the pattern of strings or chains 238 of abrasive layer 232 covers or extends over a central mid-section of face 136a of base substrate layer 114. As described above relative to coverage of the abrasive layer, only a portion of the face 136a may be covered by abrasive layer 132, while portions to either side (e.g., top and bottom) are non-abrasive. The opposite face 136b may similarly be non-abrasive, including no application of an abrasive layer 232.

Figure 4D:
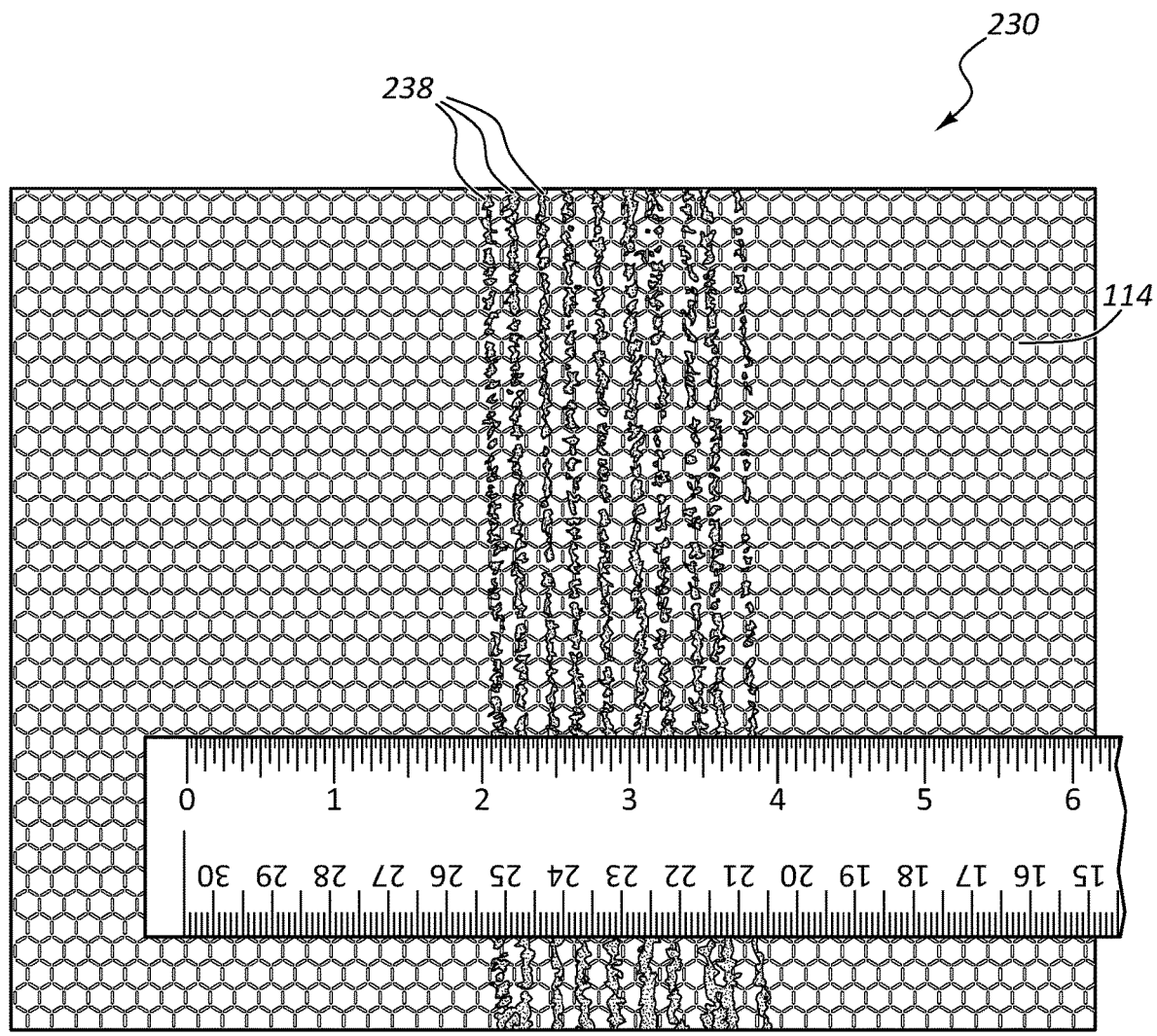
FIG. 4D is a photograph of an scrubby substrate similar to that of FIG. 4A, produced according to Example 2.
Figure 4E:
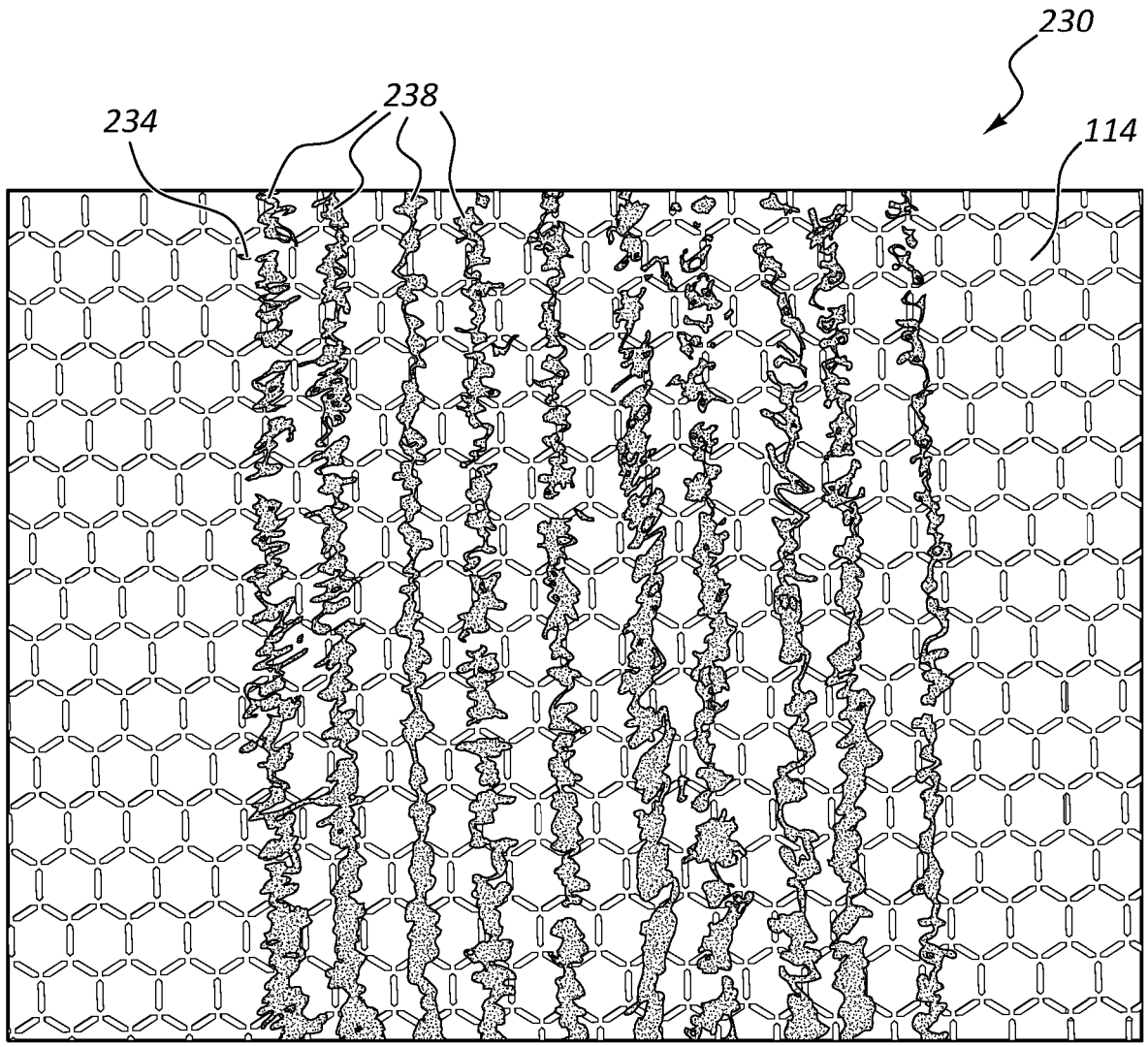
FIG. 4E is a close-up photograph of the scrubby substrate of FIG. 4D.

FIG. 4D is a photograph of an actual scrubby substrate produced according to Example 2, described below, similar to that shown in FIG. 4A. FIG. 4E is a close-up photograph of the scrubby substrate of FIG. 4D. As shown, the abrasive fibers 234, particularly as seen in FIG. 4E may merge with one another, while in their molten state, so as to cool to form substantially continuous strings or chains 238 of abrasive fibers 234 wherein the string or chain has irregular cross-sections along its length. Such a plurality of substantially linear, high frequency, low amplitude strings or chains resembles the plotted output of a seismograph or seismometer. Each chain or string 238 may be formed by a given orifice 104 of the nozzle 102. For example, the nozzle 102 (FIGS. 1-2) may include multiple orifices, and/or multiple nozzles 102 may be provided. In the illustrated embodiments, 10 strings or chains are shown, while FIG. 2 shows 2 nozzles 102, e.g., each with 5 orifices 104 (for a total of 10 orifices, and 10 strings or chains 238). It will be apparent from FIGS. 4D and 4E that such a process produces a long substantially continuous or discontinuous string or chain of such abrasive fibers, which do not break apart and disperse as in FIGS. 3D and 3E. Even though the output may thus be continuous, this differs from the fibers and filaments as described in U.S. Pat. No. 7,994,079, which produces aggregates of smaller fibers, which adhere together along portions of the separate fibers (like a spider web), rather than being a single continuous output extruded from a given orifice.

The differences between the embodiments shown in FIGS. 3A-3E as compared to FIGS. 4A-4E illustrate how the same in-line process can produce different results depending on the particular processing parameters selected for the process. Examples 1 and 2 provide details of the particular processing parameters employed in producing scrubby substrates such as those seen in FIGS. 3A-3E (coinciding with Example 1) and FIGS. 4A-4E (coinciding with Example 2).

A cleaning composition may be loaded in or onto the scrubby substrate during manufacture, as part of the in-line process. Such a cleaning composition may typically include water and one or more surfactants. The amount of surfactant may range from about 10% to about 90%, from about 25% to about 90%, from about 30% to about 90%, from about 40% to about 80%, from about 50% to about 80%, or from about 60% to about 80% by weight of the cleaning composition. Relatively higher concentrations may be associated with cleaning compositions which are provided on the scrubby substrate in a dried (e.g., dry to the touch) condition.

In dry to the touch cleaning compositions loaded onto the scrubby substrate, water may still be present (e.g., up to about 40% by weight of the composition). Where the composition loaded in or on the wipe is "wet" (e.g., wet cleaning wipes), the water content may be much higher, e.g., up to 99%. An example of a dry to the touch cleaning composition and base substrate layer suitable for use therewith is described in Applicant's U.S. Pat. No. 10,219,672, herein incorporated by reference in its entirety.

Water may be used as a solvent alone, or in combination with any suitable organic solvents. Such solvents may include, but are not limited to, C1-6 alkanols, C1-6 diols, C1-10 alkyl ethers of alkylene glycols, C3-24 alkylene glycol ethers, polyalkylene glycols, short chain carboxylic acids, short chain esters, isoparafinic hydrocarbons, mineral spirits, alkylaromatics, terpenes, terpene derivatives, terpenoids, terpenoid derivatives, formaldehyde, and pyrrolidones. Alkanols include, but are not limited to, methanol, ethanol, n-propanol, isopropanol, butanol, pentanol, and hexanol, and isomers thereof. In one embodiment of the invention, water may comprise at least 30%, at least 40%, at least 50%, at least 60%, at least 70%, at least 80%, at least 90%, or at least 95% of a cleaning composition by weight. Where included, one or more organic solvents can be present at a level of from 0.001% to 10%, from 0.01% to 10%, from 0.1% to 5%, or from 1% to 2.5% by weight.

Depending on the particular cleaning composition, components other than water and surfactant may be included within the cleaning composition. For example, an organic or mineral acid (e.g., to aid in cleaning) may be included. One or more of a chelating agent, an oxidizing agent (e.g., any peroxide, such as hydrogen peroxide), or a hypochlorite, (e.g., sodium hypochlorite), or one or more other adjuncts selected from the group consisting of fragrances, dyes, preservatives, humectants, solvents, electrolytes, polymers, pH adjusters, buffers, antimicrobial agents, solubilizers, dyes and/or colorants, stabilizers, thickeners, defoamers, hydrotropes, cloud point modifiers, preservatives and combinations thereof may also be provided. Exemplary amounts of some optional components may include less than 5%, less than 4%, less than 3%, less than 2% (e.g., from 1% to 2%, or from greater than 0.5% to about 1.5%) of an acid; less than 3%, less than 2%, less than 1% (e.g., from about 0.5% to 1%) of a pH adjuster (e.g., a hydroxide); less than 1%, less than 0.5%, less than 0.3% (e.g., from about 0.01% to 0.5%) of a solubilizer (e.g., to solubilize a fragrance or other oil); less than 1%, or less than 0.5% of dye, fragrance, and/or preservative; or less than 10%, less than 5%, less than 4%, less than 3%, less than 2%, less than 1%, or less than 0.5% of any other optional adjuvant.

Exemplary oxidants include, but are not limited to, hydrogen peroxide, alkaline metal salts and/or alkaline earth metal salts of hypochlorous acid (e.g., sodium hypochlorite), hypochlorous acid, solubilized chlorine, any source of free chlorine, solubilized chlorine dioxide, acidic sodium chlorite, active chlorine generating compounds, active oxygen generating compounds, chlorine-dioxide generating compounds, solubilized ozone, sodium potassium peroxysulfate, sodium perborate, and combinations thereof. When present, the one or more oxidants can be present at a level of from 0.001% to 10%, from 0.01% to 10%, from 0.1% to 5%, or from 0.5% to 2.5% by weight.

Buffers, buffering agents and pH adjusting agents, when used, include, but are not limited to, organic acids, mineral acids, alkali metal and alkaline earth salts of silicate, metasilicate, polysilicate, borate, carbonate, carbamate, phosphate, polyphosphate, pyrophosphates, triphosphates, tetraphosphates, ammonia, hydroxide, monoethanolamine, monopropanolamine, diethanolamine, dipropanolamine, triethanolamine, and 2-amino-2methylpropanol. Exemplary buffering agents include dicarboxlic acids, such as, succinic acid and glutaric acid. Other exemplary buffers include ammonium carbamate, citric acid, and acetic acid. Mixtures of one or more buffers may also be acceptable. Useful inorganic buffers/alkalinity sources include ammonia, the alkali metal carbonates and alkali metal phosphates, e.g., sodium carbonate, sodium polyphosphate. By way of example, when present, the buffer may be preferably present at a concentration of from about 0.001% to about 20%, from about 0.05% to about 1%, from about 0.05% to about 0.5%, or from about 0.1% to about 0.5% by weight.

The cleaning compositions may include antimicrobial (germicidal) agents or biocidal agents. Such antimicrobial agents can include, but are not limited to, alcohols, chlorinated hydrocarbons, organometallics, halogen-releasing compounds, metallic salts, pine oil, organic sulfur compounds, iodine compounds, silver nitrate, quaternary ammonium compounds (quats), chlorhexidine salts, and/or phenolics. Antimicrobial agents suitable for use in the compositions of the present invention are described in U.S. Pat. Nos. 5,686,089; 5,681,802, 5,607,980, 4,714,563; 4,163,800; 3,835,057; and 3,152,181, each of which is herein incorporated by reference in its entirety.

Suitable antimicrobial agents include alkyl alpha-hydroxyacids, aralkyl and aryl alpha-hydroxyacids, polyhydroxy alpha-hydroxyacids, polycarboxylic alpha-hydroxyacids, alpha-hydroxyacid related compounds, alpha-ketoacids and related compounds, and other related compounds including their lactone forms. Preferred antimicrobial agents include, but are not limited to, alcohols, chlorinated hydrocarbons, organometallics, halogen-releasing compounds, metallic salts, pine oil, organic sulfur compounds, iodine, compounds, antimicrobial metal cations and/or antimicrobial metal cation-releasing compounds, chitosan, quaternary alkyl ammonium biocides, phenolics, germicidal oxidants, germicidal essential oils, germicidal botanical extracts, alpha-hydroxycarboxylic acids, and combinations thereof. When included, the one or more antimicrobial agents may be present at a concentration of from about 0.001% to about 10%, from about 0.05% to about 1%, from about 0.05% to about 0.5%, or from 0.1% to about 0.5% by weight.

Any included surfactant(s) may include nonionic, anionic, cationic, ampholytic, amphoteric, zwitterionic surfactants, and mixtures thereof. A typical listing of anionic, ampholytic, and zwitterionic classes, and species of these surfactants, is given in U.S. Pat. No. 3,929,678 to Laughlin. A list of cationic surfactants is given in U.S. Pat. No. 4,259,217 to Murphy. Various alkyl polysaccharide surfactants are disclosed in U.S. Pat. No. 5,776,872 to Giret et al.; U.S. Pat. No. 5,883,059 to Furman et al.; U.S. Pat. No. 5,883,062 to Addison et al.; and U.S. Pat. No. 5,906,973 to Ouzounis et al. U.S. Pat. No. 4,565,647 to Llenado. Various nonionic surfactants can be found in U.S. Pat. No. 3,929,678 to Laughlin. Each of the above patents is incorporated by reference.

Any suitable surfactant(s) may be employed. Examples include, but are not limited to sulfates, sulfonates, betaines, alkyl polysaccharides, (e.g., alkyl polyglycosides ("APG"), also known as alkyl polyglucosides), alcohol ethoxylates, and combinations thereof. One or more of the selected surfactants may provide foam building characteristics, where foaming is desired.

By way of example, amine oxide chains may be provided with the one or more surfactants. For example, the surfactant(s) may include from 30% to 100% amine oxide components. Exemplary amine oxide chain lengths may include C8 to C16, e.g., C12 and C14. Sodium laurel sulfate (SLS) and sodium lauryl ether sulfate (SLES) are examples of suitable sulfate based amine oxide surfactants. APG chain length may be from C8 to C16, such as C8 to C14. Such chain lengths provide a good balance between hydrophobicity and hydrophilicity, creating a composition that can generate foam easily with minimal water, and which can also continue to generate foam under relatively high water conditions (e.g., as occurs when cleaning with rinse water). Various suitable APG surfactants are available from BASF under the tradename GLUCOPON (e.g., GLUCOPON 600). Various suitable SLS and SLES surfactants are available from STEPAN under the tradenames STEPANOL (e.g., STEPANOL WA EXTRA) and STEOL (e.g., STEOL CS 230). Various other surfactants available from these and other surfactant suppliers may be suitable for use.

The cleaning composition may typically have a pH from about 4 to about 8 (about 4, about 5, about 6, about 7, or about 8, or any range defined between any such values). In some embodiments, the pH, surfactant concentration, surfactant type, and concentration and/or presence of other components may be specifically configured to ensure that the composition is skin safe so as to not irritate the skin of a user as the user uses the scrubby substrate to clean a tabletop, countertop, sink, bathtub, tile, or the like. Some scrubby substrates may be configured for attachment to a tool (e.g., including a handle), such as a toilet wand head, mop, or similar. Cleaning compositions loaded in or onto such scrubby substrates may not necessarily have the same skin safe characteristics as a scrubby substrate intended for hand use.

IV. EXAMPLES

Example 1

The polymers are melted and pumped using a gridmelter, as shown in FIGS. 1 and 2. The molten polymer is sprayed through heads that have orifices in a line. This type of scrubby substrate cannot be achieved with a typical meltblown process. The resulting scrubby substrate includes a unique abrasive and visual pattern of short, globules or fragments of polymer resin material that while elongated, are generally distinct one from another, randomly oriented across the target area of the base substrate layer. Processing parameters were as follows.

Gridmelter used: ITW Dynatec model M35
Spray heads: ITW Dynatec UFD, 2 inch wide, with 5 orifice tips
Square polymer orifice at 0.5 mm by 0.6 mm
Polymer: Braskem T14900M copolymer (100 MFR) blended with 15% green pigment pellets, (Standridge Color Corporation Green 722, a 34 MFR base)
Extrusion Temperature: 480° F.
Extrusion rate: 51.84 g/min (5.184 ghm [grams/hole-min.])
Draw air temperature: 499° F.
Head pressure: 700 psi at the head inlet
Draw air flow: 52 psi (gage at the exit of the trim heater skid, see FIG. 2)
Orifice to base substrate layer distance: 3"
Linespeed: 45 ft/min
Below wire vacuum: 26 Hz fan speed
Resulting applied stripe is ~1.6" wide
Nonwoven carrier web: a 30 gsm Polypropylene SMS from PGI As described above, the resulting scrubby substrates produced using Example 1 are shown in photographic FIGS. 3D and 3E.

Example 2

The polymers are melted and pumped using a gridmelter, as shown in FIGS. 1 and 2, using the same basic process as in Example 1 but in which several parameters have been altered to create a thick substantially continuous chain or string of polymer resin globules that is deposited with a high cross-direction frequency (e.g. 30 micron in diameter average, although thickness is not uniform). This type of scrubby substrate cannot be achieved with a typical meltblown process. The processing parameters were the same as described above in Example 1, except for the following changes.

The orifice to base substrate distance 0.25"
Below wire vacuum at 21 Hz
Draw air pressure at 40 psi
Base nonwoven web: PGI spinlace As described above, the resulting scrubby substrates produced using Example 2 are shown in photographic FIGS. 4D and 4E.

Example 3

Another example similar to those above was conducted, but with the following parameters.

Polymer: T14900M Copol PP (3% green pigment)
Gridmelter: High temp filter—410° F.; Progmelt—400° F.; Premelt 2—385° F.; Premelt 1—340° F.
Spray Process Parameters: Head Temperature—450-500° F.; Through Air Temperature—500-525° F.; Hose Temp—500° F.; Air Pressure—25 to 35 psi
Orifice to base substrate distance 1.25"

Without departing from the spirit and scope of this invention, one of ordinary skill can make various changes and modifications to the invention to adapt it to various usages and conditions. As such, these changes and modifications are properly, equitably, and intended to be, within the full range of equivalence of the following claims.

The invention claimed is:

1. An in-line process for producing a scrubby substrate, the process comprising:
    (a) melting a polar polymer resin material comprising: polyvinyl chloride, polystyrene, polycarbonate, polymethyl methacrylate, polyesters, polyamides, polylactic acid (PLA), polyurethane, polyurea, viscose, rayon, epoxy resins, copolymers or combinations thereof;
    (b) extruding or otherwise dispensing the molten polar polymer resin through one or more orifices of a heated nozzle into a stream of hot inert gas which attenuates said molten resin into elongated globules that form a stream of such globules;
    (c) creating elongated globules; and
    (d) collecting said globules onto at least a portion of a surface of a base substrate layer so that the globules bond directly to the base substrate layer as the molten polymer resin cools, said globules being abrasive once cooled;
    wherein a spacing between the one or more orifices of the nozzle and the base substrate layer is less than 1 inch, to aid in globule adhesion to the base substrate layer.

2. The process of claim 1, wherein the molten resin includes an organic acid.

3. The process of claim 1, further comprising adding an abrasive particulate material to the molten polymer resin material.

4. The process of claim 1, wherein the scrubby substrate is loaded with a cleaning composition comprising: water and surfactants.

5. The process of claim 4, wherein the cleaning composition further comprises an organic solvent other than water.

6. The process of claim 4, wherein the cleaning composition further comprises a quaternary ammonium compound.

7. The process of claim 1, wherein the scrubby substrate is loaded with a cleaning composition comprising: an organic acid.

8. The process of claim 7, wherein the organic acid is citric acid.

9. The process of claim 1, wherein the polar polymer resin material comprises polyethylene terephthalate (PET).

10. The process of claim 1, wherein the polar polymer resin material comprises nylon.

11. An in-line process for producing a scrubby substrate, the process comprising:
   (a) melting a polar polymer resin material comprising at least one of: polyesters, polyamides, polylactic acid (PLA), polyurethane, polyurea, viscose, rayon, or epoxy resin;
   (b) extruding or otherwise dispensing the molten polar polymer resin through one or more orifices of a heated nozzle into a stream of hot inert gas which attenuates said molten resin into elongated globules that form a stream of such globules;
   (c) creating elongated globules having an irregular cross-section and/or an irregular thickness along a length of said elongated globules; and
   (d) collecting said globules onto at least a portion of a surface of a base substrate layer, so that the globules bond directly to the base substrate layer as the molten polymer resin cools, said globules being abrasive once cooled;
   wherein a spacing between the one or more orifices of the nozzle and the base substrate layer is less than 1 inch, to aid in globule adhesion to the base substrate layer.

12. An in-line process for producing a scrubby substrate, the process comprising:
   a. melting a polar polymer resin material comprising: polyvinyl chloride, polystyrene, polycarbonate, polymethyl methacrylate, polyesters, polyamides, polylactic acid (PLA), polyurethane, polyurea, viscose, rayon, epoxy resins, copolymers or combinations thereof;
   b. extruding or otherwise dispensing the molten polar polymer resin through one or more orifices of a heated nozzle into a stream of hot inert gas which attenuates said molten resin into elongated globules that form a stream of such globules without forming fibers or filaments;
   c. creating elongated globules; and
   d. collecting said globules onto at least a portion of a surface of a base substrate layer so that the globules bond directly to the base substrate layer as the molten polymer resin cools, said globules being abrasive once cooled;
   wherein a spacing between the one or more orifices of the nozzle and the base substrate layer is less than 6 inches, to aid in globule adhesion to the base substrate layer.

13. The process of claim 12, wherein the spacing between the one or more orifices of the nozzle and the base substrate layer is less than 3 inches.

14. The process of claim 12, further comprising adding an abrasive particulate material to the molten polymer resin material.

15. The process of claim 12, wherein the scrubby substrate is loaded with a cleaning composition comprising at least one of (i) water and surfactants or (ii) an organic acid.

16. The process of claim 12, wherein the polar polymer resin material comprises polyethylene terephthalate (PET).

17. The process of claim 12, wherein the polar polymer resin material comprises nylon.

* * * * *